(12) United States Patent
Chen et al.

(10) Patent No.: US 7,706,162 B2
(45) Date of Patent: *Apr. 27, 2010

(54) SYSTEM AND METHOD FOR PROVIDING SWITCHING TO POWER REGULATORS

(75) Inventors: Zhiliang Chen, Shanghai (CN); Shifeng Zhao, Shanghai (CN); Lieyi Fang, Shanghai (CN); Zhenhua Li, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/363,468

(22) Filed: Jan. 30, 2009

(65) Prior Publication Data

US 2009/0196081 A1   Aug. 6, 2009

Related U.S. Application Data

(63) Continuation of application No. 11/453,567, filed on Jun. 14, 2006, now Pat. No. 7,511,978.

(30) Foreign Application Priority Data

May 24, 2006   (CN) .................... 2006 1 0027041

(51) Int. Cl.
   *H02M 3/335*   (2006.01)
(52) U.S. Cl. .......................... 363/97; 363/95

(58) Field of Classification Search ............. 363/21.04, 363/21.07, 21.12, 21.17, 95, 97, 98, 131; 323/222, 282–288, 351, 290; 327/147, 198
See application file for complete search history.

(56) References Cited

U.S. PATENT DOCUMENTS

| | | | | |
|---|---|---|---|---|
| 4,975,823 A * | 12/1990 | Rilly et al. | ............. | 363/21.16 |
| 5,265,003 A * | 11/1993 | Kayser et al. | ............. | 363/131 |
| 6,054,890 A * | 4/2000 | Giacomo | ............. | 327/375 |
| 6,380,796 B2 * | 4/2002 | Sakai et al. | ............. | 327/434 |
| 6,650,169 B2 * | 11/2003 | Faye et al. | ............. | 327/404 |

* cited by examiner

*Primary Examiner*—Rajnikant B Patel
(74) *Attorney, Agent, or Firm*—Jones Day

(57) ABSTRACT

System and method for providing switching to power regulators. According to an embodiment, the present invention provides system for providing switching. The system includes a first voltage supply that is configured to provide a first voltage. The system also includes a second voltage supply that is configured to provide a second voltage. The second voltage being independent from the first voltage. The system additionally includes a controller component that is electrically coupled to the first voltage supply. For example, the controller component being configured to receive at least a first input signal and to provide at least a first output signal. Additionally, the system includes a gate driver component that is electrically coupled to the second voltage supply. The gate driver component is configured to receive at least the first output signal and generated a second output signal in response to at least the second voltage and the first output signal.

35 Claims, 11 Drawing Sheets

SYSTEM AND METHOD FOR PROVIDING SWITCHING TO POWER REGULATORS

CROSS-REFERENCES TO RELATED APPLICATIONS

This application is a continuation of U.S. application Ser. No. 11/453,567, filed Jun. 14, 2006, now U.S. Pat. No. 7,511,978 which claims priority to Chinese Patent Application No. 200610027041.5, filed May 24, 2006, titled "System and Method for Providing Switching to Power Regulators," by inventors Zhiliang Chen, Shifeng Zhao, Lieyi Fang, and Zhenhua Li, commonly assigned, and both applications are incorporated by reference herein for all purposes.

BACKGROUND OF THE INVENTION

The present invention is related to integrated circuits. More specifically, the present invention can be applied to controllers used for switch mode power supply. According to various embodiments, the present invention provides integrated power switch implemented with different types of transistors. Merely by way of example, the present invention can be used in switch mode power conversion system including, among other things, offline fly-back converters and forward converters. But it would be recognized that the invention has a much broader range of applicability.

Power converters are widely used in various applications, such providing power to portable consumer electronics. The power converters can convert electric power from one form to another form. As an example, the electric power is transformed from alternate current (AC) to direct current (DC), from DC to AC, from AC to AC, or from DC to DC. Additionally, the power converters can convert electric power from one voltage level to another voltage level.

In the past various types of power converters have been developed. For example, linear regulators have traditionally been used for power converters. A linear regulator is a voltage regulator based on an active device (such as a bipolar junction transistor, field effect transistor or vacuum tube) operating in its "linear region" or passive devices like zener diodes operated in their breakdown region. The regulating device is made to act like a variable resistor. While linear regulators have been used for many years, their power efficiency is often inadequate for portable electronics. For example, due to low power efficiency, linear regulators often waste large amount of energy and generate excessive heat for portable devices.

With the advent of integrated circuits, switched-mode power supply has been invented and utilized for various applications. Switch mode power supplies are typically implemented with a switching regulator, which is an internal control circuit that switches the load current rapidly on and off in order to stabilize the output voltage. For certain applications, switch mode power supply uses pulse-width-modulated (PWM) or pulse-frequency-modulated (PFM) mechanism. These mechanisms are usually implemented with a switch-mode-controller including various protection components.

In a switching power conversion system, various types of transistors are used to implement power switching elements. For example, power MOSFET, power bipolar transistor (BJT), Insulated Gate Bipolar Transistor (IGBT), or other types transistors have been used. Usually, the power switching elements are controlled by PWM, PFM or other types of control signal are adjusted based on feedback from output. For example, fly-back configuration is used to enable the feedback system. The output voltage and/or current is regulated by sensing the output voltage or current and applying the corresponding control signals to the power switching elements.

FIG. 1 is a simplified conventional switch mode converter implemented with PWM feedback configuration. This diagram is merely an example, which should not unduly limit the scope of the claims. One of ordinary skill in the art would recognize many variations, alternatives, and modifications. A switch mode converter 100 includes an OCP comparator 110, a PWM controller component 120, a gate driver 130, a power switch 140, resistors 150, 152, 154, and 156, and a primary winding 160. For example, the OCP comparator 110, the PWM controller component 120, and the gate driver 130 are parts of a chip 180 for PWM control. When the current of the primary winding is greater than a limiting level, the PWM controller component 120 turns off the power switch 140 and shuts down the switch mode power converter 100.

During operation, the PWM controller component 120 is used to control and drive a power switch 140, which turns on and off to control the power delivered to the load in the secondary side. For example, the power switch 140 is a power MOSFET. In general, separate PWM controller module and the power MOSFET are widely used.

As mentioned above, switch regulators such as the conventional switch mode converter illustrated in FIG. 1 has various advantages over linear regulators. However, for various applications, the conventional switch mode converter is often inadequate. For example, switching regulators are typically more complex and more expensive, their switching currents can cause noise problems if not carefully suppressed, and simple designs may have a poor power factor.

Therefore, it is desirable to have an improved system and method for switching power conversion system.

BRIEF SUMMARY OF THE INVENTION

The present invention is related to integrated circuits. More specifically, the present invention can be applied to controllers used for switch mode power supply. According to various embodiments, the present invention provides integrated power switch implemented with different types of transistors. Merely by way of example, the present invention can be used in switch mode power conversion system including, among other things, offline fly-back converters and forward converters. But it would be recognized that the invention has a much broader range of applicability.

According to an embodiment, the present invention provides a system for providing switching. The system includes a first voltage supply that is configured to provide a first voltage. The system also includes a second voltage supply that is configured to provide a second voltage. According to the embodiment, the second voltage is independent from the first voltage. The system additionally includes a controller component that is electrically coupled to the first voltage supply. For example, the controller component being configured to receive at least a first input signal and to provide at least a first output signal. Additionally, the system includes a gate driver component that is electrically coupled to the second voltage supply. The gate driver component is configured to receive at least the first output signal and generated a second output signal in response to at least the second voltage and the first output signal. Additionally, the system includes a switch being configured to receive the second output signal and change between a first state and a second state in response to the second output signal.

According to another embodiment, the present invention provides a system for providing switching. The system includes a first voltage supply that is configured to provide a first voltage. The system also includes a first impedance that can be characterized by a first impedance value. The system additionally includes a second impedance that can be characterized by a second impedance value. The system further includes a controller component that is electrically coupled to the first voltage supply. For example, the controller component is configured to receive at least a first input signal and to provide a first output signal and a second output signal. Additionally, the system includes a gate driver component, which includes a first transistor and a second transistor. The gate driver component is configured to receive the first output signal and the second output signal and generate a third output signal in response to at least the first output signal and the second output signal. Also, the system includes a switch that is configured to receive the third output signal and change between a first state and a second state in response to the third output signal. The first transistor includes a first terminal, a second terminal, and a third terminal. The second transistor includes a fourth terminal, a fifth terminal, and a sixth terminal. The first terminal is electrically coupled to the first impedance. The second terminal is configured to receive the first output signal. The third terminal is electrically coupled to the fourth terminal. The fifth terminal is configured to receive the second output signal. The sixth terminal is electrically coupled to the second impedance. The third output signal is associated with a voltage related to the third terminal and the fourth terminal.

According to yet another embodiment, the present invention provides a system for providing switching. The system includes a first voltage supply that is configured to provide a first voltage. The system also includes an impedance that can be characterized by an impedance value. The impedance includes a resistor and a capacitor, the resistor and capacitor being in parallel. The system additionally includes a controller component that is electrically coupled to the first voltage supply. The controller component is configured to receive at least a first input signal and provide a first output signal and a second output signal. The system additionally includes a gate driver component that includes a first transistor and a second transistor. The gate driver component is configured to receive the first output signal and the second output signal and generate a third output signal in response to at least the first output signal and the second output signal. The system additionally includes a switch that is configured to receive the third output signal and change between a first state and a second state in response to the third output signal. The first transistor includes a first terminal, a second terminal, and a third terminal. The second transistor includes a fourth terminal, a fifth terminal, and a sixth terminal. The first terminal is electrically coupled to the impedance. The second terminal is configured to receive the first output signal. The third terminal is electrically coupled to the fourth terminal. The fifth terminal is configured to receive the second output signal. The third output signal is associated with a voltage related to the third terminal and the fourth terminal.

According to yet another embodiment, the present invention provides a system for providing switching. They system includes an integrated circuit package. The integrated circuit package includes a first terminal being configured to receive a first voltage. The package also includes a second terminal that is configured to receive a second voltage and being independent of the first terminal. The package additionally includes a controller component that is electrically coupled to the first voltage terminal. The controller component is configured to receive at least a first input signal and to provide a first output signal. The package additionally includes a gate driver component that is electrically coupled to the second voltage terminal. The gate driver component is configured to receive the first output signal and generated a second output signal in response to the second voltage and the first output signal. The package also includes a switch being configured to receive the second output signal and change between a first state and a second state in response to the second output signal.

It is to be appreciated the present invention provide various advantages. According to various embodiments, the present invention provides a solution for reducing power consumption of switching devices and unwanted EMI. More particularly, the present invention offers a higher degree of flexibility in the design and implementation of power system. According to various embodiments, the present invention provides the ability to adjust the response time and efficient of power switch. For example, the present invention can be easily implemented with integrated switch mode power converter design. According to an embodiment, the present invention can also be practiced in a switch mode power converter design where power controller and power switch are implemented on separate chips. There are other benefits as well.

Various additional objects, features and advantages of the present invention can be more fully appreciated with reference to the detailed description and the accompanying drawings that follow.

DETAILED DESCRIPTION OF THE INVENTION

The present invention is related to integrated circuits. More specifically, the present invention can be applied to controllers used for switch mode power supply. According to various embodiments, the present invention provides integrated power switch implemented with different types of transistors.

Merely by way of example, the present invention can be used in switch mode power conversion system including, among other things, offline fly-back converters and forward converters. But it would be recognized that the invention has a much broader range of applicability.

As explained above, conventional switch mode converter is often inadequate. For example, switching regulators are typically more complex and more expensive, their switching currents can cause noise problems if not carefully suppressed, and simple designs may have a poor power factor.

Figure 1:
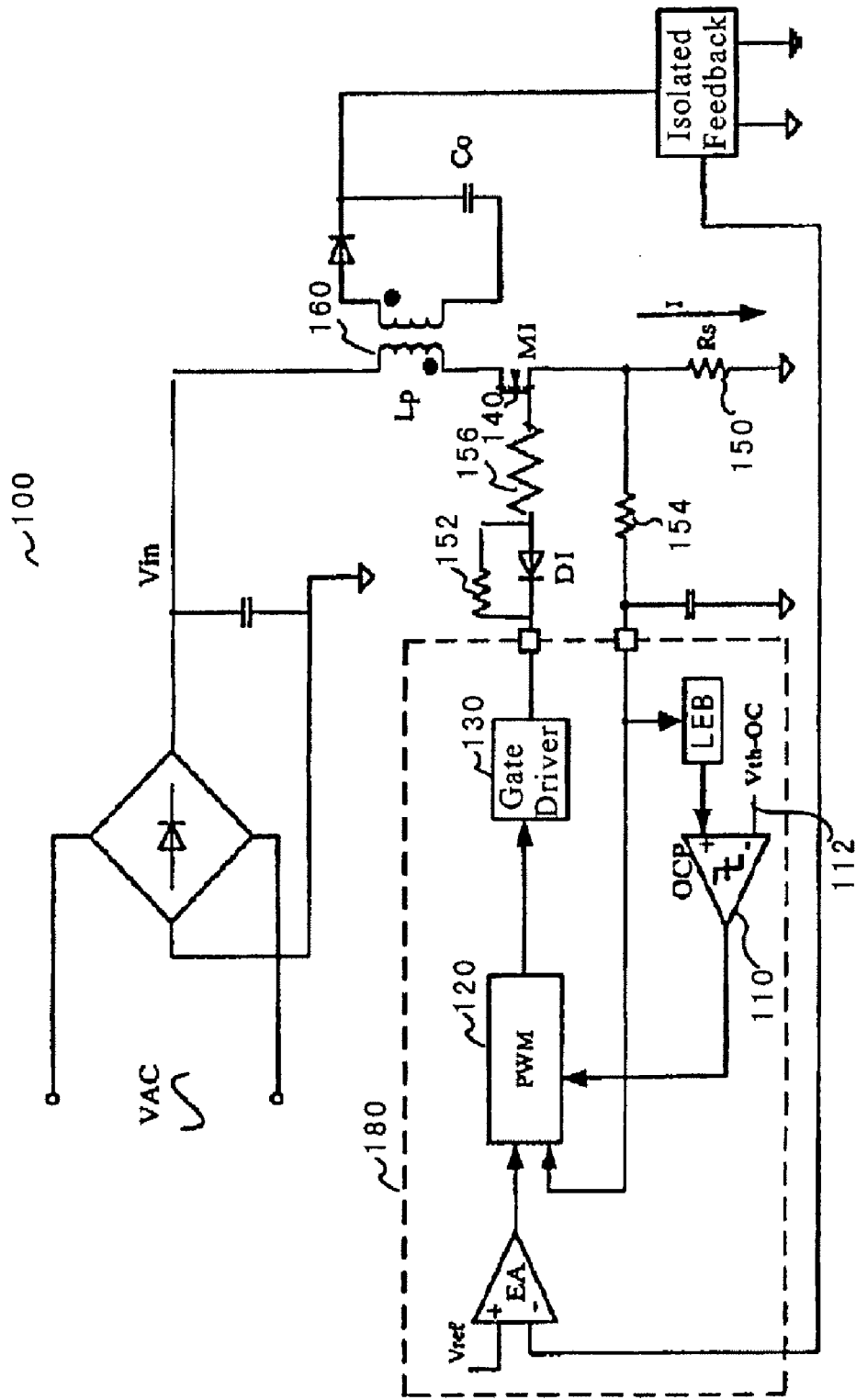
FIG. 1 is a simplified conventional switch mode converter implemented with PWM feedback configuration.
Figure 2:
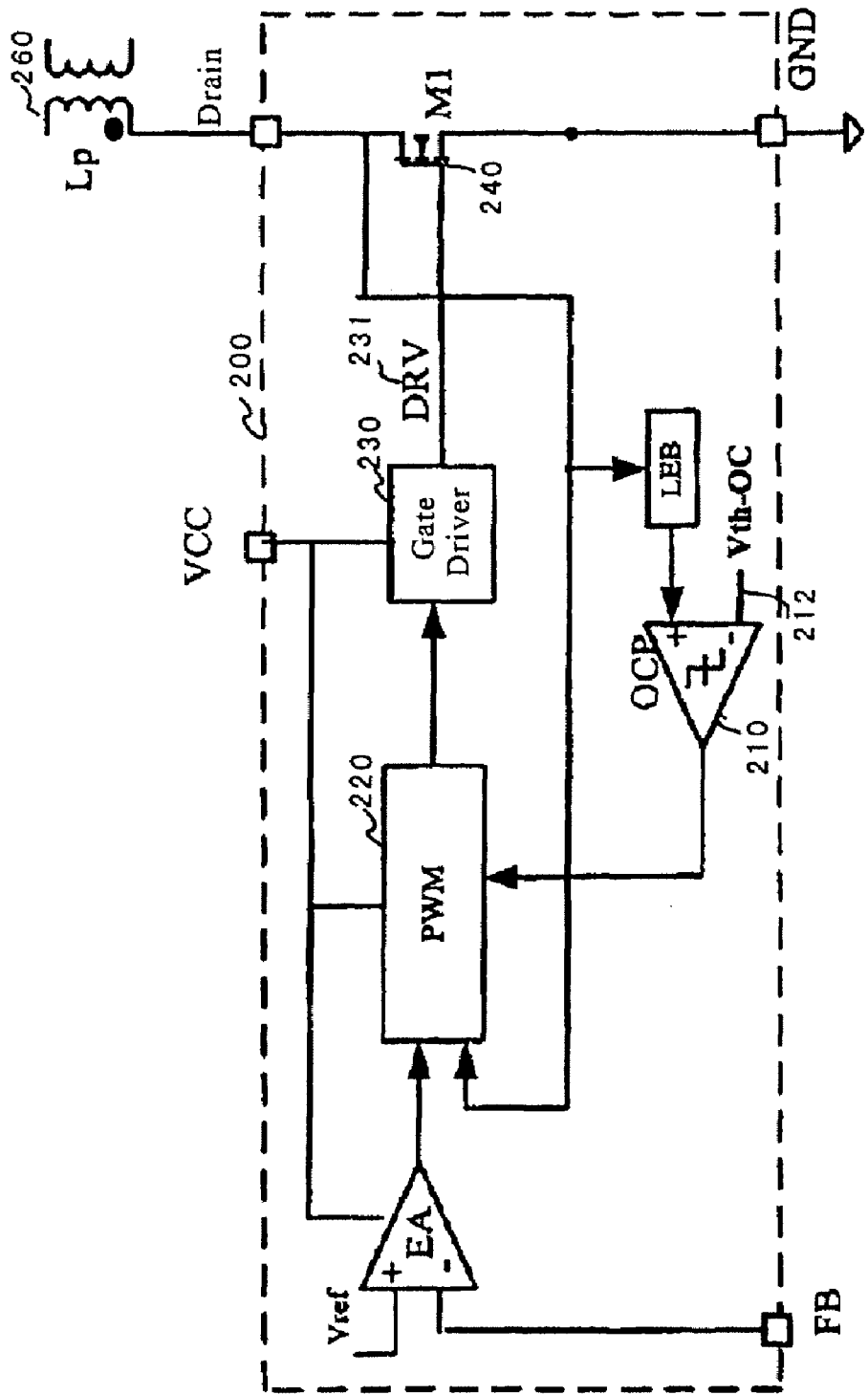
FIG. 2 is a simplified conventional integrated switch mode converter.

Over the years, with development in integrated circuits, various attempts have been made to integrate power switch and the PWM controller module. FIG. 2 is a simplified conventional integrated switch mode converter. This diagram is merely an example, which should not unduly limit the scope of the claims. One of ordinary skill in the art would recognize many variations, alternatives, and modifications. An integrated switch mode converter 200, which is implemented on a single chip, includes, among other things, an OCP comparator 210, a PWM controller component 220, a gate driver 230, a power switch 240. When the current of a primary winding 260 is greater than a limiting level, the PWM controller component 220 turns off the power switch 240 and shuts down the switch mode power converter 200.

Integrated device such as the integrated switch mode converter 200 provides various advantages. For example, integration often allows lowered costs and improved reliability, as few numbers of components are required in an integrated system. However, previous efforts in providing integrate power solution have fallen short. Usually, conventional integrated power solutions fail to provide adequate flexibility for the design of power conversion system. As a result, conventional integrated power solutions often have low power efficiency, which causes excessive power consumption and electromagnetic interference (EMI). For example, fast turn on and off cause high voltage spikes which impose high voltage stress on the devices or elements used. Voltage spike higher than the rated voltage causes damage of the device. Therefore, optimization of the gate driver which determines the power MOSFET turn on and turn off time course for specific power conversion application is high desirable.

At the time of the present invention, conventional integrated solutions, in which PWM controller module and power switch are integrated, do not provide the ability to adjust gate drive capability. As a result, conventional integrated power switches are often implemented with components of higher voltage ratings as compared to non-integrated power switches. For example, due to higher voltage ratings of components, devices utilizing conventional integrated power switches often fail to meet various EMI requirements. It is to be appreciated that, according to various embodiments, the present invention provides various integrated power solution that allows gate drive capability to be adjustable.

Typically, the performance of a conventional power switch (such the integrated switch mode converter 200 shown in FIG. 2) is related to the output of driving signal from the gate driver 230. For example, the rising time and fall time of the driving signal 231 affect the voltage spikes generated on the terminal Drain and EMI of the power conversion system.

Figure 3:
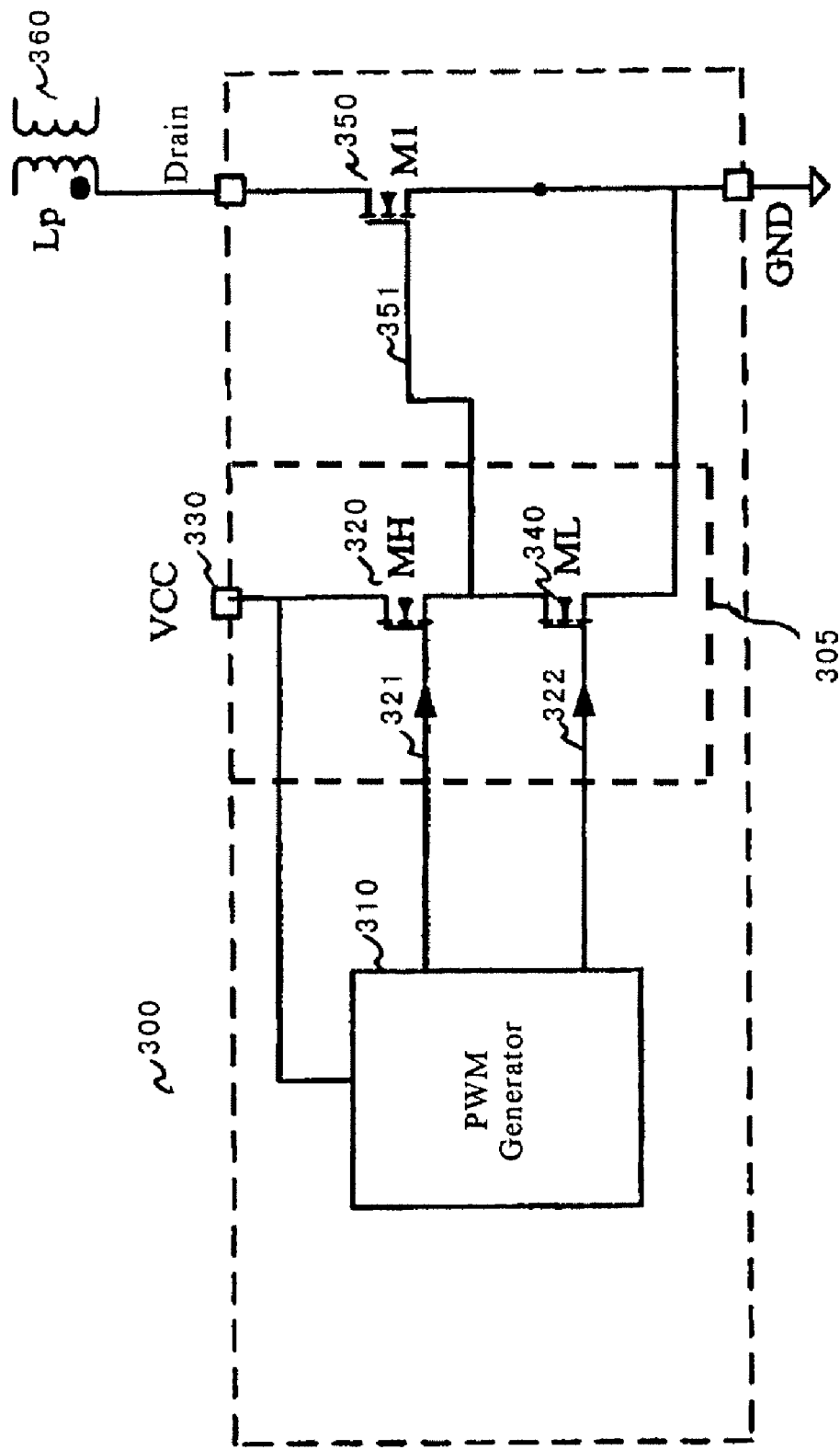
FIG. 3 is a simplified diagram illustrating a conventional gate driver as used in a conventional integrated power switch.

FIG. 3 is a simplified diagram illustrating a conventional gate driver as used in a conventional integrated power switch. This diagram is merely an example, which should not unduly limit the scope of the claims. One of ordinary skill in the art would recognize many variations, alternatives, and modifications. A conventional integrated switch mode converter 300, which is implemented on a single chip, includes, among other things, a PWM controller component 310, a gate driver 305, a power switch 350. The gate driver 305 is implemented with two power MOSFETs MH 320 and ML 340. The MH 320 receives input 321 from the PWM controller component 310. The MH 340 receives input 322 from the PWM controller component 310. The PWM controller component 310 is configured to provide complimentary inputs to the MH 320 and ML 340. For example, when input 321 is on, the input 322 is off; when input 321 is off, the input 322 is on. In addition, the MH 320 is connected to a voltage source Vcc 330, which also connects to the PWM controller component 310.

When transistor MH 320 is on and ML 340 is off, the drive signal 351 at a high state caused by the current flowing through MH 320. The high state of the drive signal 351 charges the gate capacitance of power switch 350. When the drive signal 351 has a voltage higher than the threshold voltage of power switch 350, the power switch 350 is turned on. Once the power switch 350 is turned on, electrical current flows through the primary winding 360 and causes energy to be stored in the primary winding 60.

When MH 320 is off and ML 340 is on, the drive signal 351 at a low state, which causes discharging of gate charge at the power switch 350 through the ML 340. When the voltage of the drive signal 351 is below the threshold voltage of the power switch 350, the power switch 350 is turned off and the energy stored in primary winding 60 is transferred to a secondary side and usually discharge to a capacitor.

Usually, the performance and efficiency power switch is related to the response time characterized by the rise and fall time of the driving signal. For the conventional integrated switch mode converter 300, the rise time and fall time of the drive signal 351 are determined by the MH 320 and ML 340. Typically, fast switching of the power switch 350 results in high voltage spike, which could causes damages to the power switch 350 and other components. Additionally, the high voltage spikes often lead to large EMI in the power conversion system.

As explained above, since response time of the driving signal is so important, it is desirable to be able to control and modify the response time. Typically, conventional integrated switch mode converters have fixed response time, which is related to the built-in PWM controller module and the power switch. As a result, users of the conventional integrated switch mode converter are unable to adjust the response time according to specific applications. This inflexibility to tune conventional integrated switch mode converter often causes undesirable effects (as explained above) such as damages to system components, unwanted EMI, etc.

Figure 4:
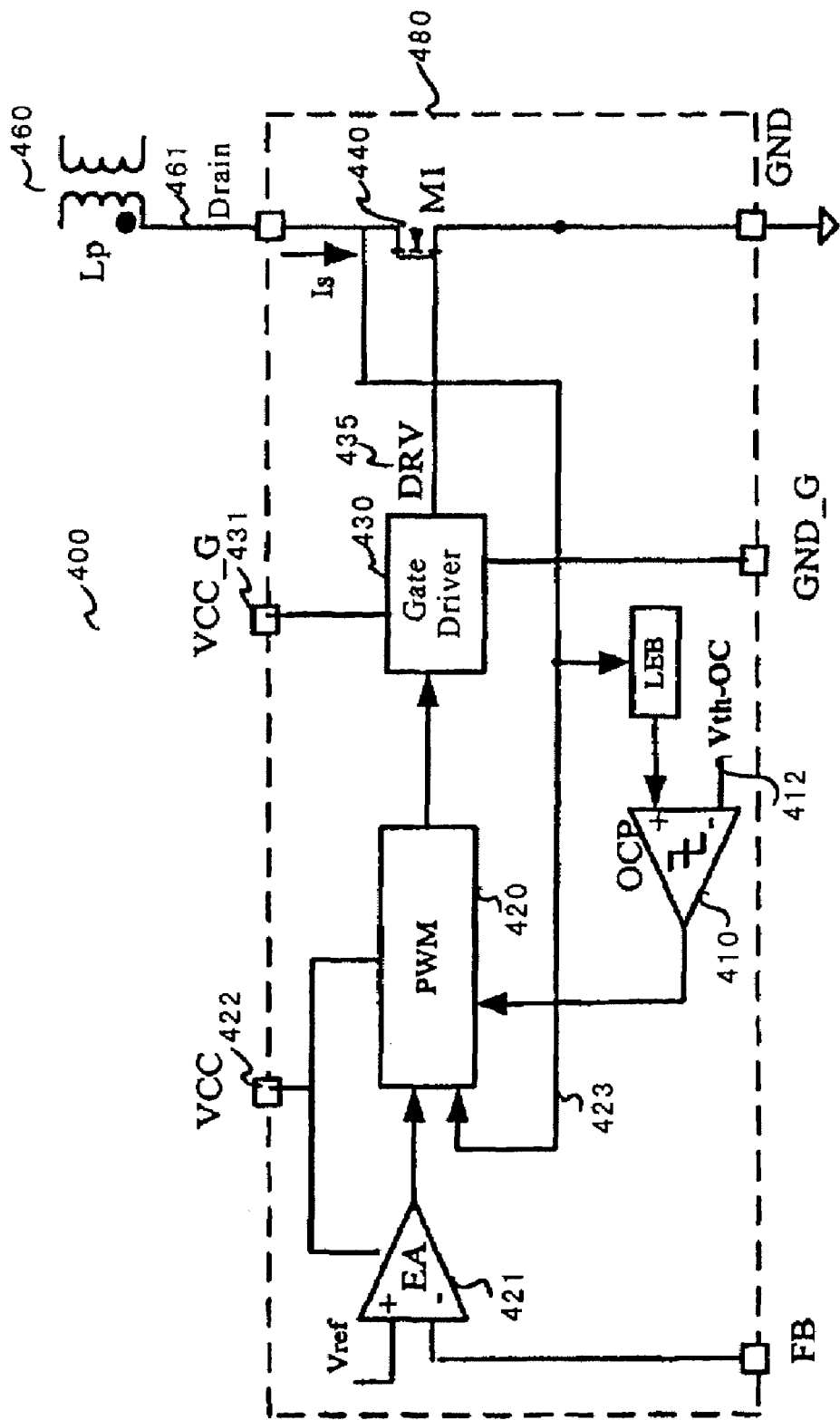
FIG. 4 is a simplified diagram illustrating an integrated switch mode converter according to an embodiment of the present invention.

Therefore, it is to be appreciated that, according to various embodiments, the present invention provides, among other things, users the ability to adjust various properties of integrated switch mode converters FIG. 4 is a simplified diagram illustrating an integrated switch mode converter according to an embodiment of the present invention. This diagram is merely an example, which should not unduly limit the scope of the claims. One of ordinary skill in the art would recognize many variations, alternatives, and modifications. A power system 400 includes an integrated switch mode converter 480 which is coupled to a primary winding 460. For example, the integrated switch mode converter 480 is implemented in a single chip. The integrated switch mode converter 480 including the following components:

an amplifier 421;
a PWM controller component 420;
an OCP comparator 410;
a gate driver 430; and
a power switch 440.

As shown in FIG. 4, the power switch 440 is implemented with an n-type power MOSFET. Depending upon application, the power switch 440 can be implemented with other types of components, such BJT, IGBT, etc. The terminal 461 of the power switch 440 is electrically connected to the PWM controller component to provide a feedback signal. For example, the PWM controller component 420 includes a logic module.

According to the embodiment, the PWM controller component 420 and the gate driver 430 are powered by separate power supplies. For example power supplies can be AC power source, DC power, source, etc. Typically, power supplies are not a part of the power switch and connected to the power switch via standard power connection pins. The PWM controller component 420 is powered by the power source VCC 422. The gate driver 430 is powered by the power source VCC_G 431. For example, the power source VCC_G 431 can be adjusted to allow users to adjust driving signal 435, which in turn determines the response time of the power switch 440. For example, an increase in VCC_G 431 causes an increase in the voltage for the driving signal 435, which reduces the rise time and the fall time of the power switch 440. On the other hand, a decrease in VCC_G 431 causes a decrease in the voltage for the driving signal 435, which increases the rise time and the fall time of the power switch 440.

Figure 5:
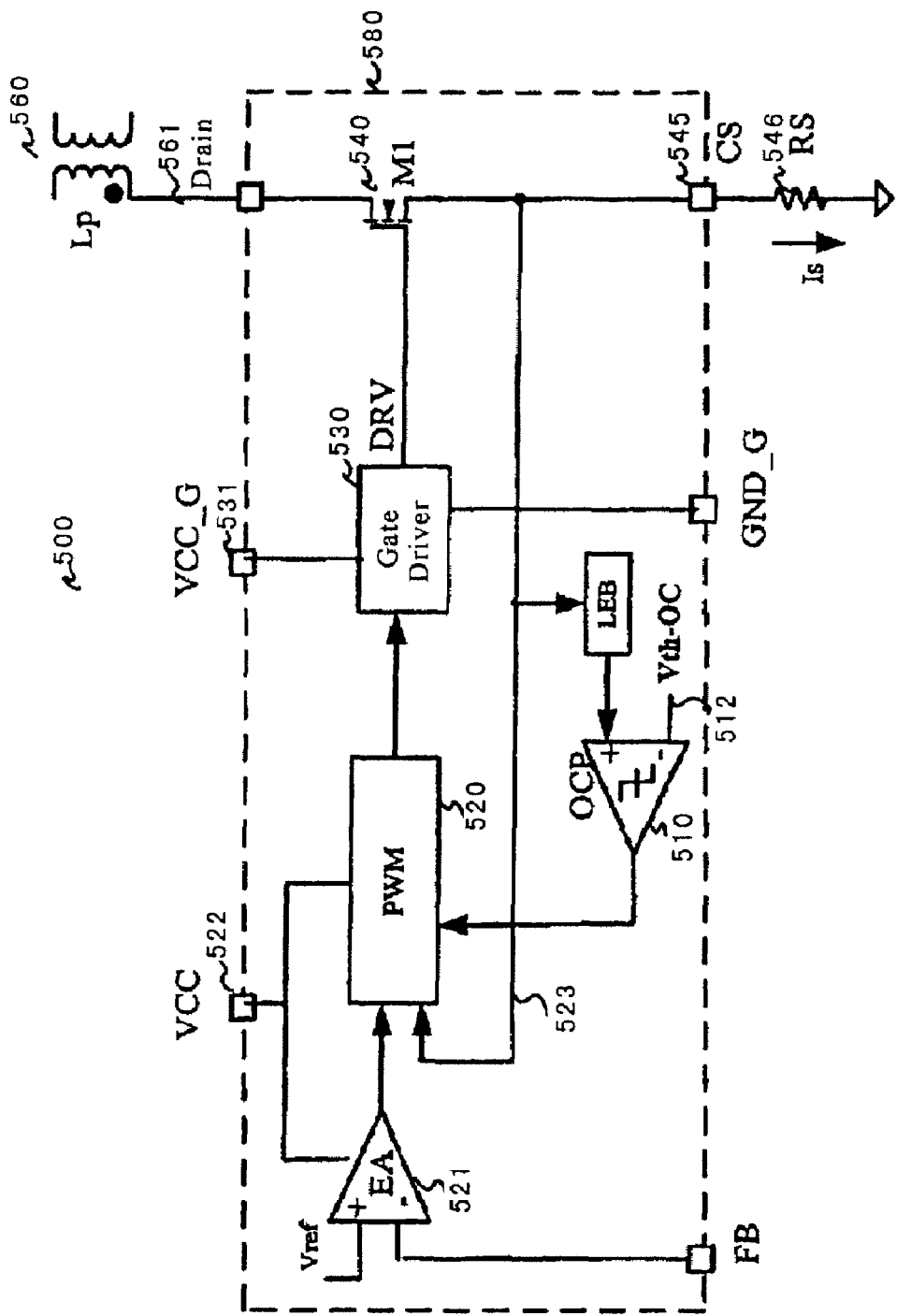
FIG. 5 is a simplified diagram illustrating an integrated switch mode converter according to an embodiment of the present invention.

It is to be appreciated that the present invention offers various degree of design flexibility depending upon application. FIG. 5 is a simplified diagram illustrating an integrated switch mode converter according to another embodiment of the present invention. This diagram is merely an example, which should not unduly limit the scope of the claims. One of ordinary skill in the art would recognize many variations, alternatives, and modifications. A power system 500 includes an integrated switch mode converter 580 which is coupled to a primary winding 560. For example, the integrated switch mode converter 580 is implemented in a single chip. The integrated switch mode converter 580 including the following components:

- an amplifier 521;
- a PWM controller component 520;
- an OCP comparator 510;
- a gate driver 530; and
- a power switch 540.

As shown in FIG. 5, the power switch 540 is implemented with an n-type power MOSFET. Depending upon application, the power switch 540 can be implemented with other types of components, such BJT, IGBT, etc. The terminal 545 of the power switch 540 is electrically connected to the PWM controller 520 component to provide a feedback signal. Terminal 561 of the power switch 540 is electrically connected to the primary winding 560.

According to the embodiment, the PWM controller component 520 and the gate driver 530 are powered by separate power supplies. For example power supplies can be AC power source, DC power, source, etc. Typically, power supplies are not a part of the power switch and connected to the power switch via standard power connection pins. The PWM controller component 520 is powered by the power source VCC 522. The gate driver 530 is powered by the power source VCC_G 531. For example, the power source VCC_G 531 can be adjusted to allow users to adjust driving signal 535, which in turn determines the response time of the power switch 540. For example, an increase in VCC_G 531 causes an increase in the voltage for the driving signal 535, which reduces the rise time and the fall time of the power switch 540. On the other hand, a decrease in VCC_G 531 causes a decrease in the voltage for the driving signal 535, which increases the rise time and the fall time of the power switch 540.

According to an embodiment, the present invention provides a system for providing switching. The system includes a first voltage supply that is configured to provide a first voltage. The system also includes a second voltage supply that is configured to provide a second voltage. According to the embodiment, the second voltage is independent from the first voltage. The system additionally includes a controller component that is electrically coupled to the first voltage supply. For example, the controller component being configured to receive at least a first input signal and to provide at least a first output signal. Additionally, the system includes a gate driver component that is electrically coupled to the second voltage supply. The gate driver component is configured to receive at least the first output signal and generated a second output signal in response to at least the second voltage and the first output signal. Additionally, the system includes a switch being configured to receive the second output signal and change between a first state and a second state in response to the second output signal. For example, the embodiment is illustrated according to FIGS. 4 and 5.

Figure 6:
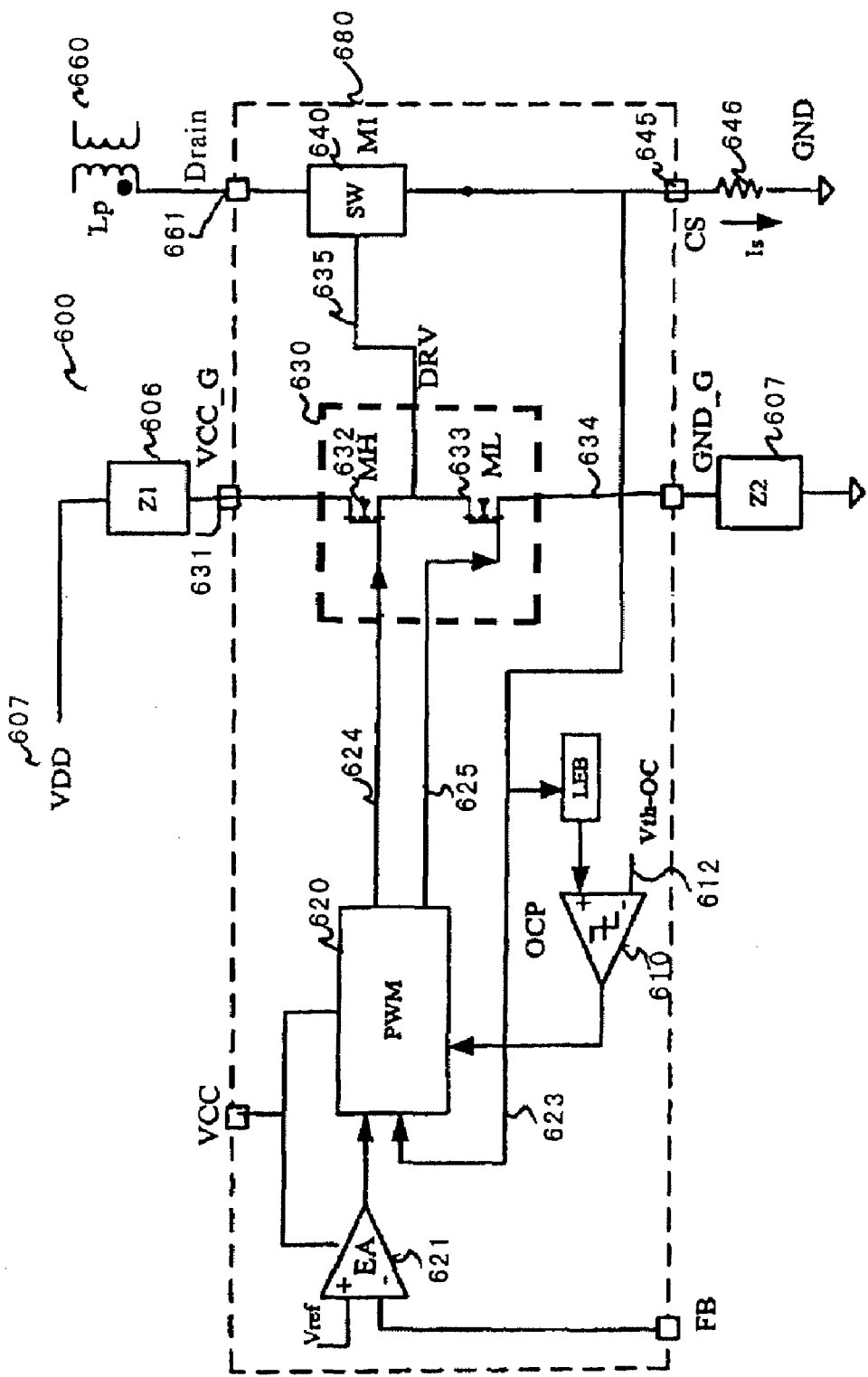
FIG. 6 is a simplified diagram illustrating an integrated switch mode converter according to an embodiment of the present invention.

It is to be appreciated that according to various embodiments, the present invention provides various mechanisms that allow adjusting the processing power. FIG. 6 is a simplified diagram illustrating an integrated switch mode converter according to an embodiment of the present invention. This diagram is merely an example, which should not unduly limit the scope of the claims. One of ordinary skill in the art would recognize many variations, alternatives, and modifications.

A power system 600 includes an integrated switch mode converter 680, which is coupled to a primary winding 560. For example, the integrated switch mode converter 680 is implemented in a single chip. The power system 600 also includes impedances 606 and 607. Depending upon application, the impedances 606 and 607 can be implemented by various types of electrical components, such as resistor, capacitor, transistor, or combination thereof. For example, impedances 606 and 607 are resistors. It is to be appreciated that the values of the impedances 606 and 607 can be adjusted depending upon applications. For certain application, values of the impedances 606 and 607 may be zero.

The integrated switch mode converter 680 including the following components:

- an amplifier 621;
- a PWM controller component 620;
- an OCP comparator 610;
- a gate driver 630; and
- a power switch 640.

Depending upon application, the integrated switch converter 680 may include other components, such as amplifier, resistor, capacitor, etc. As shown in FIG. 6, the power switch 640 is implemented with an n-type power MOSFET. Depending upon application, the power switch 640 can be implemented with other types of components, such BJT, IGBT, etc. The terminal 661 of the power switch 640 is electrically connected to the PWM controller 620 component to provide a feedback signal. Terminal 661 of the power switch 640 is electrically connected to the primary winding 660.

The gate driver 630 is implemented with two power MOSFETs MH 632 and ML 633. The MH 632 receives input 624 from the PWM controller component 620. The ML 633 receives input 625 from the PWM controller component 620. The PWM controller component 620 is configured to provide complimentary inputs to the MH 632 and ML 633. For example, when input 624 is on, the input 625 is off; when input 624 is off, the input 625 is on. According to an embodiment, the PWM controller component includes logic module to provide complimentary inputs 624 and 625. In addition, the MH 632 is connected to a voltage source VCC_G 631.

The voltage of the voltage source VCC_G 631 is partly determined by the impedance 606, which is connected to the voltage source VDD 607. For example, a large value for the impedance 606 would produce a large voltage differential between the voltage source VCC_G 631 and the voltage source VDD 607, thereby reducing the voltage of the VCC_G 631. On the other hand, a small value for the impedance 606 would produce a small voltage differential between the voltage source VCC_G 631 and the voltage source VDD 607, thereby producing a relatively higher voltage of the voltage source, VCC_G 631. The voltage of the voltage source VCC_G 631, among other things, affects, the rise time of the driving signal 635. For example, a higher value of the impedance 606 causes a lower voltage at the voltage source VCC_G 631, a longer rise time of the driving signal 635, and an slow turning on of the power switch 640. On the other hand, a lower value of the impedance 606 causes a higher voltage at the voltage source VCC_G 631, a shorter rise time of the driving signal 635, and an fast turning on of the power switch 640.

As an example, various voltage sources (e.g., VCC, VDD, VCC_G) are implemented with power sources, such as AC power source, DC power source, etc. Typically, power source are not a part of the power switch and connected to the power switch via standard connection pins.

The transistor ML 633 is electrically connected to power switch 640 and allows energy to be discharge from the power switch 640. The source terminal 634 is electrically connected to the impedance 607. The value of the impedance 607 affects the fall time (i.e., how fast energy can be dissipated to ground through the impedance 607) of the driving signal 653. The fall time of the driving signal 635 affects how fast the power switch 640 can be turned off. For example, a high value of the impedance 607 results in a long fall time and slow turning of the power switch 640. On the other hand, a low value of the impedance 607 results in a short fall time and fast turning of the power switch 640.

Figure 7:
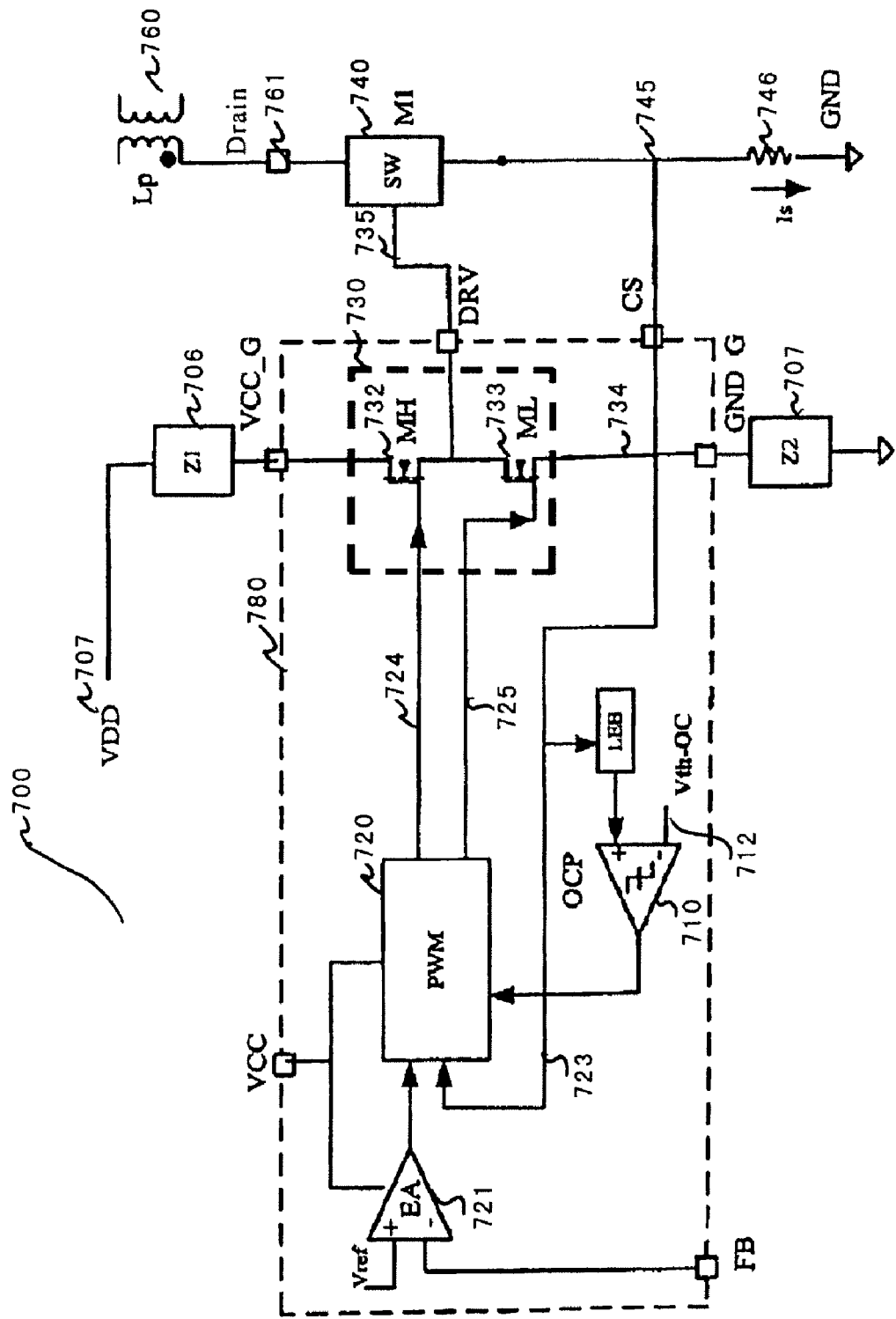
FIG. 7 is a simplified diagram illustrating an integrated switch mode converter according to an embodiment of the present invention.

FIG. 7 is a simplified diagram illustrating an integrated switch mode converter according to an embodiment of the present invention. This diagram is merely an example, which should not unduly limit the scope of the claims. One of ordinary skill in the art would recognize many variations, alternatives, and modifications.

A power system 700 includes an integrated switch mode converter 780, a power switch 740, and a primary winding 760. The switch mode converter 780 is electrically connected to the power switch 740. For example, the integrated switch mode converter 680 and the power switch 740 are implemented on two separate chips. The power system 700 also includes impedances 706 and 707. Depending upon application, the impedances 706 and 707 can be implemented by various types of electrical components, such as resistor, capacitor, transistor, or combination thereof. For example, impedances 706 and 707 are resistors. It is to be appreciated that the values of the impedances 706 and 707 can be adjusted according to application. For certain application, values of the impedances 706 and 707 may be zero.

The integrated switch mode converter 780 including the following components:
- an amplifier 721;
- a PWM controller component 720;
- an OCP comparator 710; and
- a gate driver 730.

Depending upon application, the integrated switch converter 780 may include other components, such as amplifier, resistor, capacitor, etc. As shown in FIG. 7, the power switch 740 is implemented with an n-type power MOSFET. Depending upon application, the power switch 740 can be implemented with other types of components, such BJT, IGBT, etc. The terminal 761 of the power switch 740 is electrically connected to the PWM controller 720 component to provide a feedback signal. Terminal 761 of the power switch 740 is electrically connected to the primary winding 760.

The gate driver 730 is implemented with two power MOSFETs MH 732 and ML 733. The MH 732 receives input 724 from the PWM controller component 720. The ML 733 receives input 725 from the PWM controller component 720. The PWM controller component 710 is configured to provide complimentary inputs to the MH 732 and ML 733. For example, when input 724 is on, the input 725 is off; when input 724 is off, the input 725 is on. According to an embodiment, the PWM controller component includes logic module to provide complimentary inputs 724 and 725. In addition, the MH 732 is connected to a voltage source VCC_G 731.

The voltage of the voltage source VCC_G 731 is partly determined by the impedance 706, which is connected to the voltage source VDD 707. For example, a large value for the impedance 706 would produce a large voltage differential between the voltage source VCC_G 731 and the voltage source VDD 707, thereby reducing the voltage of the VCC_G 731. On the other hand, a small value for the impedance 706 would produce a small voltage differential between the voltage source VCC_G 731 and the voltage source VDD 707, thereby producing a relatively higher voltage of the voltage source, VCC_G 731. The voltage of the voltage source VCC_G 731, among other things, affects, the rise time of the driving signal 735. For example, a higher value of the impedance 706 causes a lower voltage at the voltage source VCC_G 731, a longer rise time of the driving signal 735, and an slow turning on of the power switch 740. On the other hand, a lower value of the impedance 706 causes a higher voltage at the voltage source VCC_G 731, a shorter rise time of the driving signal 735, and an fast turning on of the power switch 740.

As an example, various voltage sources (e.g., VCC, VDD, VCC_G) are implemented with power sources, such as AC power source, DC power source, etc. Typically, power source are not a part of the power switch and connected to the power switch via standard connection pins.

The transistor ML 733 is electrically connected to power switch 740 and allows energy to be discharge from the power switch 740. The source terminal 734 is electrically connected to the impedance 707. The value of the impedance 707 affects the fall time (i.e., how fast energy can be dissipated to ground through the impedance 707) of the driving signal 653. The fall time of the driving signal 635 affects how fast the power switch 740 can be turned off. For example, a high value of the impedance 707 results in a long fall time and slow turning of the power switch 740. On the other hand, a low value of the impedance 707 results in a short fall time and fast turning of the power switch 740.

Figure 8:
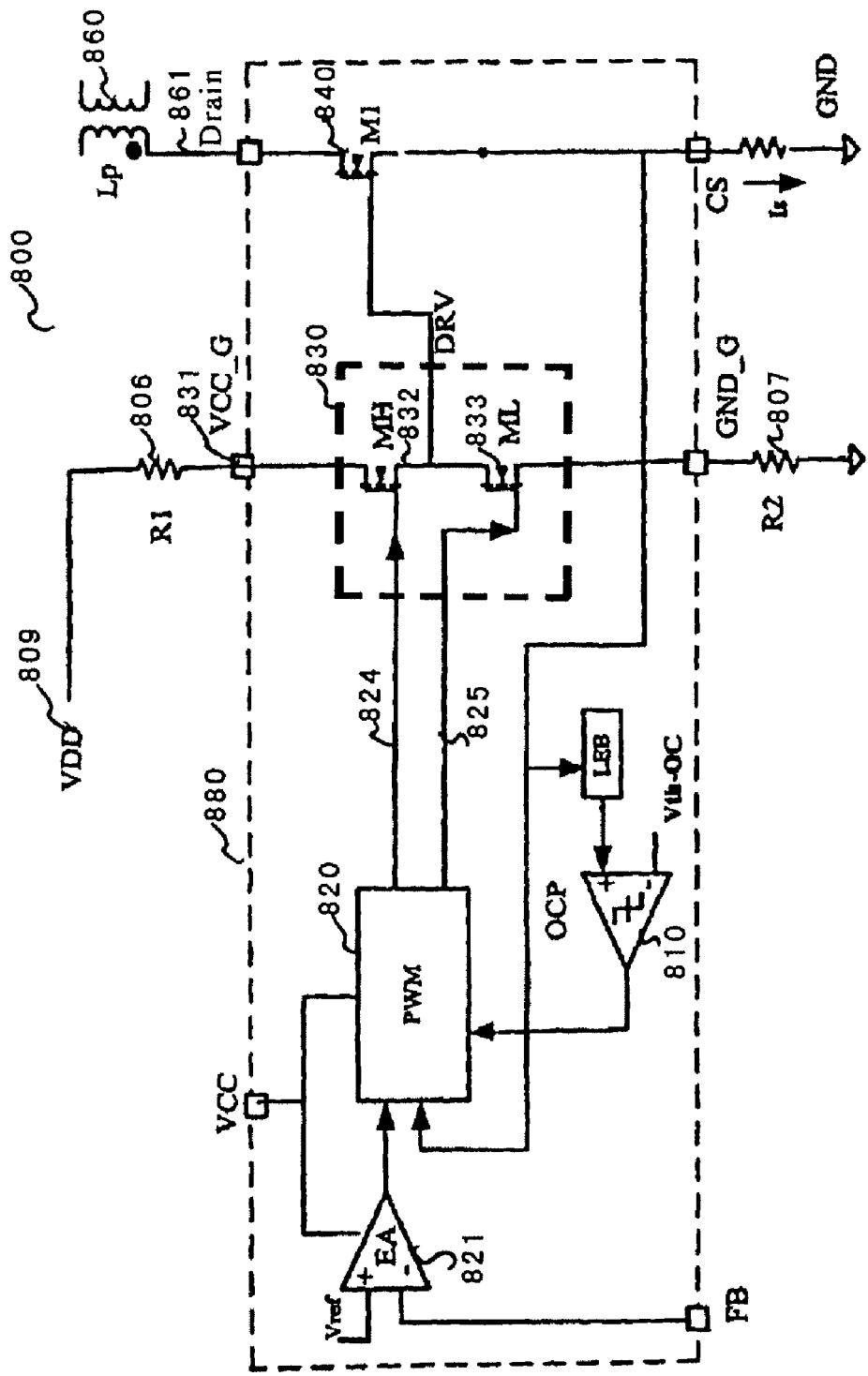
FIG. 8 is a simplified diagram illustrating an integrated switch mode converter according to an embodiment of the present invention.

FIG. 8 is a simplified diagram illustrating an integrated switch mode converter according to an embodiment of the present invention. This diagram is merely an example, which should not unduly limit the scope of the claims. One of ordinary skill in the art would recognize many variations, alternatives, and modifications.

A power system 800 includes an integrated switch mode converter 880, which is coupled to a primary winding 860. For example, the integrated switch mode converter 880 is implemented in a single chip. The power system 800 also includes resistors 806 and 807. It is to be appreciated that the values of the resistors 806 and 807 can be adjusted according to application. According to an embodiment, the resistors 806 and 807 are variable resistors, such as potentiometer, rheostats, metal oxide varistor, thermistor, sensistor, etc. For certain application, values of the resistors 806 and 807 may be zero.

The integrated switch mode converter 880 including the following components:
an amplifier 821;
a PWM controller component 820;
an OCP comparator 810;
a gate driver 830; and
a power switch 840.

Depending upon application, the integrated switch converter 880 may include other components, such as amplifier, resistor, capacitor, etc. As shown in FIG. 8, the power switch 840 is implemented with an n-type power MOSFET. Depending upon application, the power switch 840 can be implemented with other types of components, such BJT, IGBT, etc. The terminal 861 of the power switch 840 is electrically connected to the PWM controller 820 component to provide a feedback signal. Terminal 861 of the power switch 840 is electrically connected to the primary winding 860.

The gate driver 830 is implemented with two power MOSFETs MH 832 and ML 833. The MH 832 receives input 824 from the PWM controller component 820. The ML 833 receives input 825 from the PWM controller component 820. The PWM controller component 820 is configured to provide complimentary inputs to the MH 832 and ML 833. For example, when input 824 is on, the input 825 is off; when input 824 is off, the input 825 is on. According to an embodiment, the PWM controller component includes logic module to provide complimentary inputs 824 and 825. In addition, the MH 832 is connected to a voltage source VCC_G 831.

The voltage of the voltage source VCC_G 831 is partly determined by the resistor 806, which is connected to the voltage source VDD 809. For example, a large value for the resistor 806 would produce a large voltage differential between the voltage source VCC_G 831 and the voltage source VDD 809, thereby reducing the voltage of the VCC_G 831. On the other hand, a small value for the resistor 806 would produce a small voltage differential between the voltage source VCC_G 831 and the voltage source VDD 809, thereby producing a relatively higher voltage of the voltage source, VCC_G 831. The voltage of the voltage source VCC_G 831, among other things, affects, the rise time of the driving signal 835. For example, a higher value of the resistor 806 causes a lower voltage at the voltage source VCC_G 831, a longer rise time of the driving signal 835, and an slow turning on of the power switch 840. On the other hand, a lower value of the resistance 806 causes a higher voltage at the voltage source VCC_G 831, a shorter rise time of the driving signal 835, and an fast turning on of the power switch 840.

As an example, various voltage sources (e.g., VCC, VDD, VCC_G) are implemented with power sources, such as AC power source, DC power source, etc. Typically, power source are not a part of the power switch and connected to the power switch via standard connection pins.

The transistor ML 833 is electrically connected to power switch 840 and allows energy to be discharge from the power switch 840. The source terminal 834 is electrically connected to the resistor 807. The value of the resistor 807 affects the fall time (i.e., how fast energy can be dissipated to ground through the resistor 807) of the driving signal 853. The fall time of the driving signal 835 affects how fast the power switch 840 can be turned off. For example, a high value of the resistor 807 results in a long fall time and slow turning of the power switch 840. On the other hand, a low value of the resistor 807 results in a short fall time and fast turning of the power switch 840.

Figure 9:
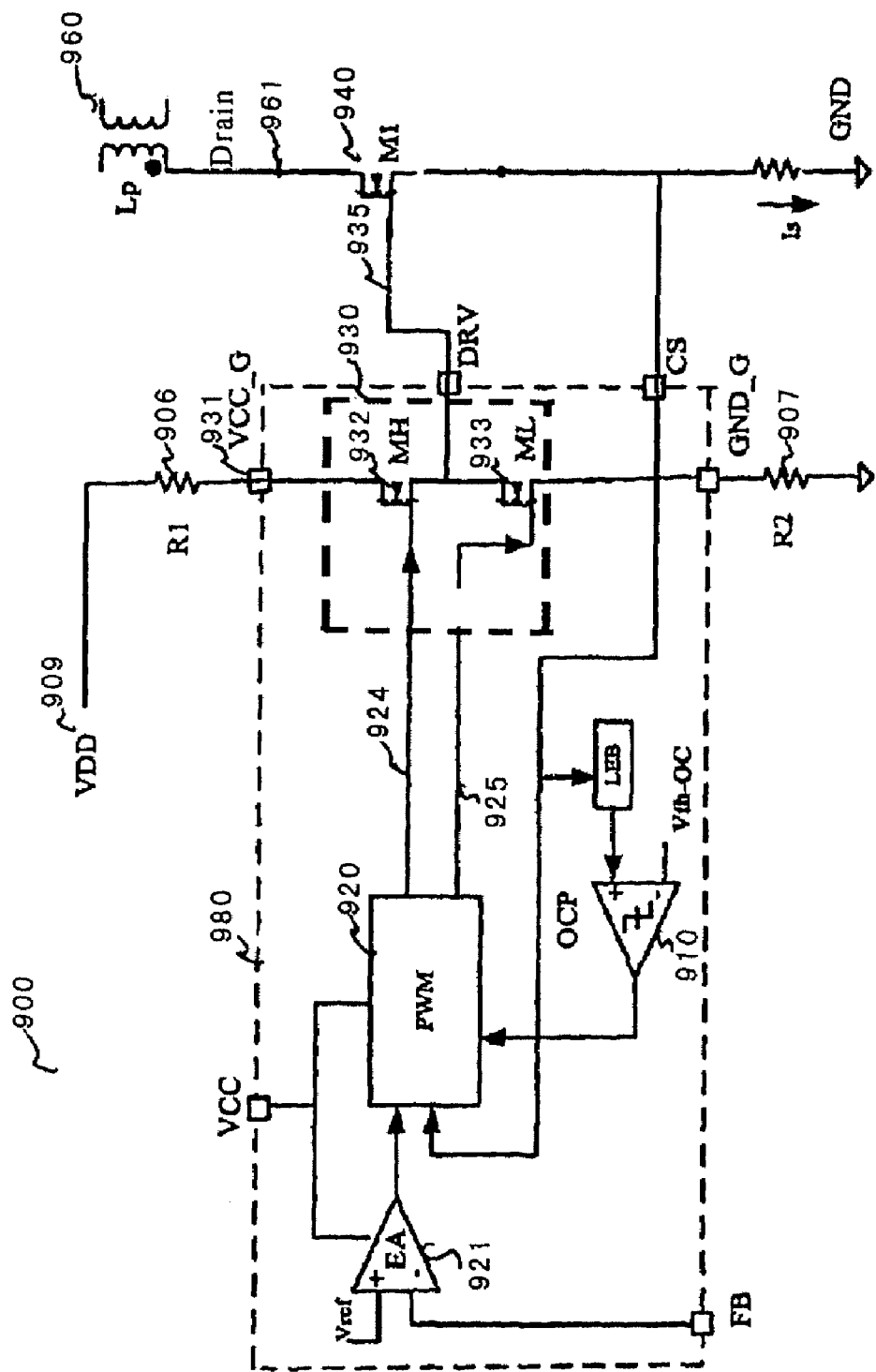
FIG. 9 is a simplified diagram illustrating an integrated switch mode converter according to an embodiment of the present invention.

FIG. 9 is a simplified diagram illustrating an integrated switch mode converter according to an embodiment of the present invention. This diagram is merely an example, which should not unduly limit the scope of the claims. One of ordinary skill in the art would recognize many variations, alternatives, and modifications.

A power system 900 includes an integrated switch mode converter 980, a power switch 940, and a primary winding 960. The switch mode converter 980 is electrically connected to the power switch 940. For example, the integrated switch mode converter 980 and the power switch 940 are implemented on two separate chips. The power system 900 also includes resistors 906 and 907. It is to be appreciated that the values of the resistors 906 and 907 can be adjusted according to application. For example, resistors 906 and 907 are implemented with variable resistors, such as potentiometer, rheostats, metal oxide varistor, thermistor, sensistor, etc. For certain application, values of the resistors 906 and 907 may be zero.

The integrated switch mode converter 880 including the following components:
an amplifier 921;
a PWM controller component 920;
an OCP comparator 910; and
a gate driver 930.

Depending upon application, the integrated switch converter 980 may include other components, such as amplifier, resistor, capacitor, etc. As shown in FIG. 7, the power switch 940 is implemented with an n-type power MOSFET. Depending upon application, the power switch 940 can be implemented with other types of components, such BJT, IGBT, etc. The terminal 961 of the power switch 940 is electrically connected to the PWM controller 920 component to provide a feedback signal. Terminal 961 of the power switch 940 is electrically connected to the primary winding 960.

The gate driver 930 is implemented with two power MOSFETs MH 932 and ML 933. The MH 732 receives input 924 from the PWM controller component 920. The ML 933 receives input 925 from the PWM controller component 920. The PWM controller component 910 is configured to provide complimentary inputs to the MH 932 and ML 933. For example, when input 924 is on, the input 925 is off; when input 924 is off, the input 925 is on. According to an embodiment, the PWM controller component includes logic module to provide complimentary inputs 924 and 925. In addition, the MH 932 is connected to a voltage source VCC_G 931.

The voltage of the voltage source VCC_G 931 is partly determined by the resistor 906, which is connected to the voltage source VDD 907. For example, a large value for the resistor 906 would produce a large voltage differential between the voltage source VCC_G 931 and the voltage source VDD 909, thereby reducing the voltage of the VCC_G 931. On the other hand, a small value for the resistor 906 would produce a small voltage differential between the voltage source VCC_G 931 and the voltage source VDD 909, thereby producing a relatively higher voltage of the voltage source, VCC_G 931. The voltage of the voltage source VCC_G 931, among other things, affects, the rise time of the driving signal 935. For example, a higher value of the resistor 906 causes a lower voltage at the voltage source VCC_G 931, a longer rise time of the driving signal 935, and an slow turning on of the power switch 940. On the other hand, a lower value of the resistor 906 causes a higher voltage at the voltage source VCC_G 931, a shorter rise time of the driving signal 935, and an fast turning on of the power switch 940.

As an example, various voltage sources (e.g., VCC, VDD, VCC_G) are implemented with power sources, such as AC power source, DC power source, etc. Typically, power source are not a part of the power switch and connected to the power switch via standard connection pins.

The transistor ML 933 is electrically connected to power switch 940 and allows energy to be discharge from the power switch 940. The source terminal 934 is electrically connected to the resistor 907. The value of the resistor 907 affects the fall time (i.e., how fast energy can be dissipated to ground through the resistor 907) of the driving signal 953. The fall time of the driving signal 935 affects how fast the power switch 940 can be turned off. For example, a high value of the resistor 907 results in a long fall time and slow turning of the power switch 940. On the other hand, a low value of the resistor 907 results in a short fall time and fast turning of the power switch 940.

According to another embodiment, the present invention provides a system for providing switching. The system includes a first voltage supply that is configured to provide a first voltage. The system also includes a first impedance that can be characterized by a first impedance value. The system additionally includes a second impedance that can be characterized by a second impedance value. The system further includes a controller component that is electrically coupled to the first voltage supply. For example, the controller component is configured to receive at least a first input signal and to provide a first output signal and a second output signal. Additionally, the system includes a gate driver component, which includes a first transistor and a second transistor. The gate driver component is configured to receive the first output signal and the second output signal and generate a third output signal in response to at least the first output signal and the second output signal. Also, the system includes a switch that is configured to receive the third output signal and change between a first state and a second state in response to the third output signal. The first transistor includes a first terminal, a second terminal, and a third terminal. The second transistor includes a fourth terminal, a fifth terminal, and a sixth terminal. The first terminal is electrically coupled to the first impedance. The second terminal is configured to receive the first output signal. The third terminal is electrically coupled to the fourth terminal. The fifth terminal is configured to receive the second output signal. The sixth terminal is electrically coupled to the second impedance. The third output signal is associated with a voltage related to the third terminal and the fourth terminal. For example, the embodiment is illustrated in FIGS. 6-9.

Figure 10:
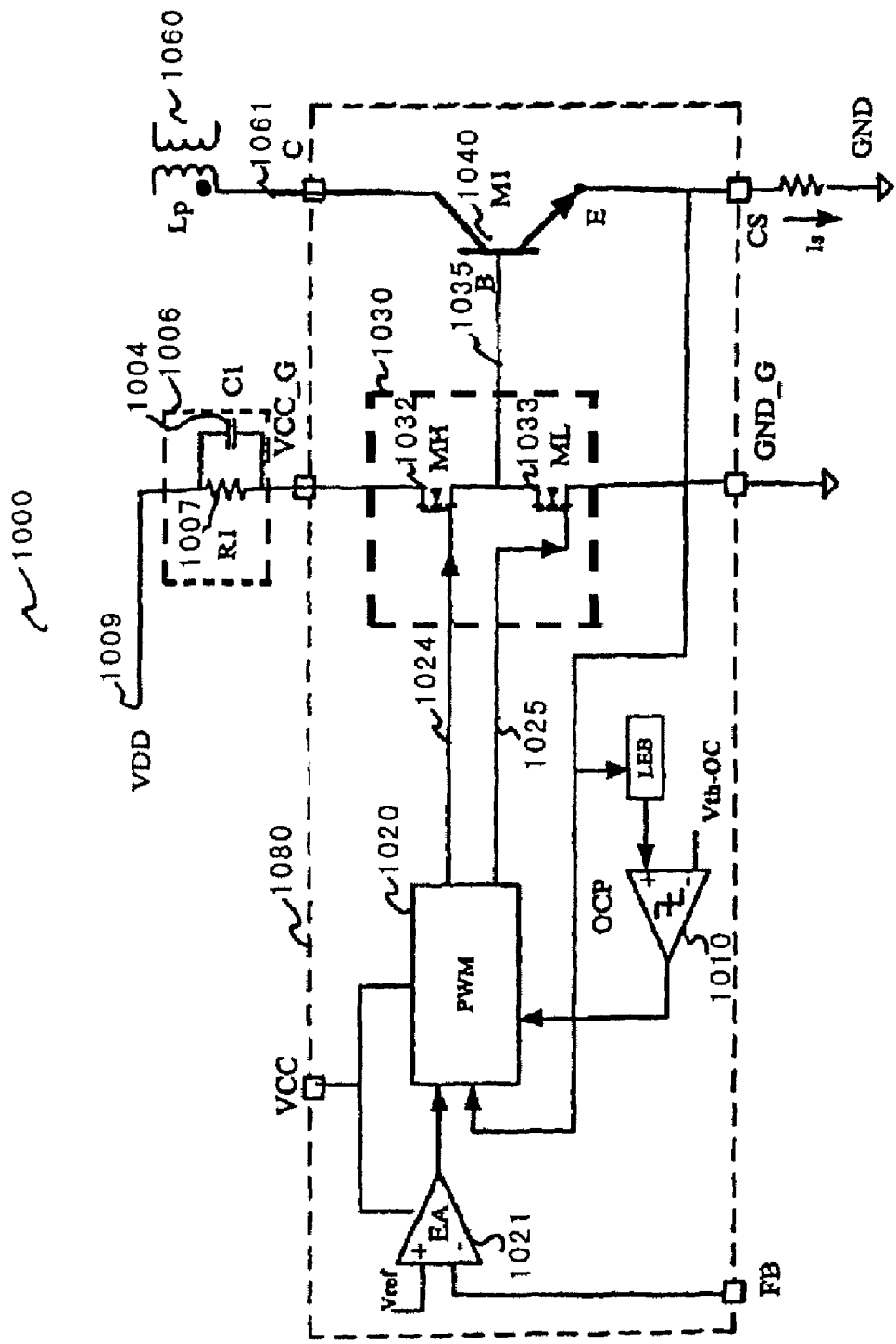
FIG. 10 is a simplified diagram illustrating an integrated switch mode converter according to an embodiment of the present invention.

FIG. 10 is a simplified diagram illustrating an integrated switch mode converter according to an embodiment of the present invention. This diagram is merely an example, which should not unduly limit the scope of the claims. One of ordinary skill in the art would recognize many variations, alternatives, and modifications.

A power system 1000 includes an integrated switch mode converter 1080, which is coupled to a primary winding 1060. For example, the integrated switch mode converter 1080 is implemented in a single chip with a power switch 1040. The power system 1000 also includes impedance 1006. According to an embodiment, the impedance 1006 includes resistor 1007 and capacitor 1004 in parallel. Depending upon application, the impedance 1006 can be implemented with other types of components as well. For example, the impedance 1006 includes additional resistor and capacitors.

The integrated switch mode converter 1080 including the following components:
 an amplifier 1021;
 a PWM controller component 1020;
 an OCP comparator 1010;
 a gate driver 1030; and
 a power switch 1040.

Depending upon application, the integrated switch converter 1080 may include other components, such as amplifier, resistor, capacitor, etc. As shown in FIG. 10, the power switch 1040 is implemented with an npn power BJT. Depending upon application, the power switch 1040 can be implemented with other types of components, such MOSFET, IGBT, etc. The terminal 1061 of the power switch 1040 is electrically connected to the PWM controller 1020 component to provide a feedback signal. Terminal 1061 of the power switch 1040 is electrically connected to the primary winding 1060. For example, the terminal 1061 is connected to the collector terminal of the BJT.

The gate driver 1030 is implemented with two power MOSFETs MH 1032 and ML 1033. The MH 1032 receives input 1024 from the PWM controller component 1020. The ML 1033 receives input 1025 from the PWM controller component 1020. The PWM controller component 1020 is configured to provide complimentary inputs to the MH 1032 and ML 1033. For example, when input 1024 is on, the input 1025 is off; when input 1024 is off, the input 1025 is on. According to an embodiment, the PWM controller component includes logic module to provide complimentary inputs 1024 and 1025. In addition, the MH 1032 is connected to a voltage source VCC_G 1031.

The voltage of the voltage source VCC_G 1031 is partly determined by the impedance 1006, which is connected to the voltage source VDD 1009. The amount of electrical current that can be provided by the VCC_G 1031 is also partly determined by the impedance 1006. For example, amount of current at VCC_G is inversely proportional to the resistance value of resistor 1007 (I=VDD/R1). The current provided by the VCC_G is essentially provided to the power switch 1040 as the base current of the BJT. As a result, the response time of the power switch 1040 is affected by the resistance value of the resistor 1007. For example, a large resistance value for the resistor 1007 produces a small current for the power switch and a slow response time. On the other hand, a large resistance value for the resistor 1007 produces a large current for the power switch and a fast response time.

As an example, various voltage sources (e.g., VCC, VDD, VCC_G) are implemented with power sources, such as AC power source, DC power source, etc. Typically, power source are not a part of the power switch and connected to the power switch via standard connection pins.

The response time of the power switch is also related to the capacitor 1006. For example, charges stored in the capacitor 1006 is used to provide transient current that can be provided to the BJT. Typically, the charges stored in the capacitor 1006 reduces the time it required for the power switch 1040 to turn on.

Figure 11:
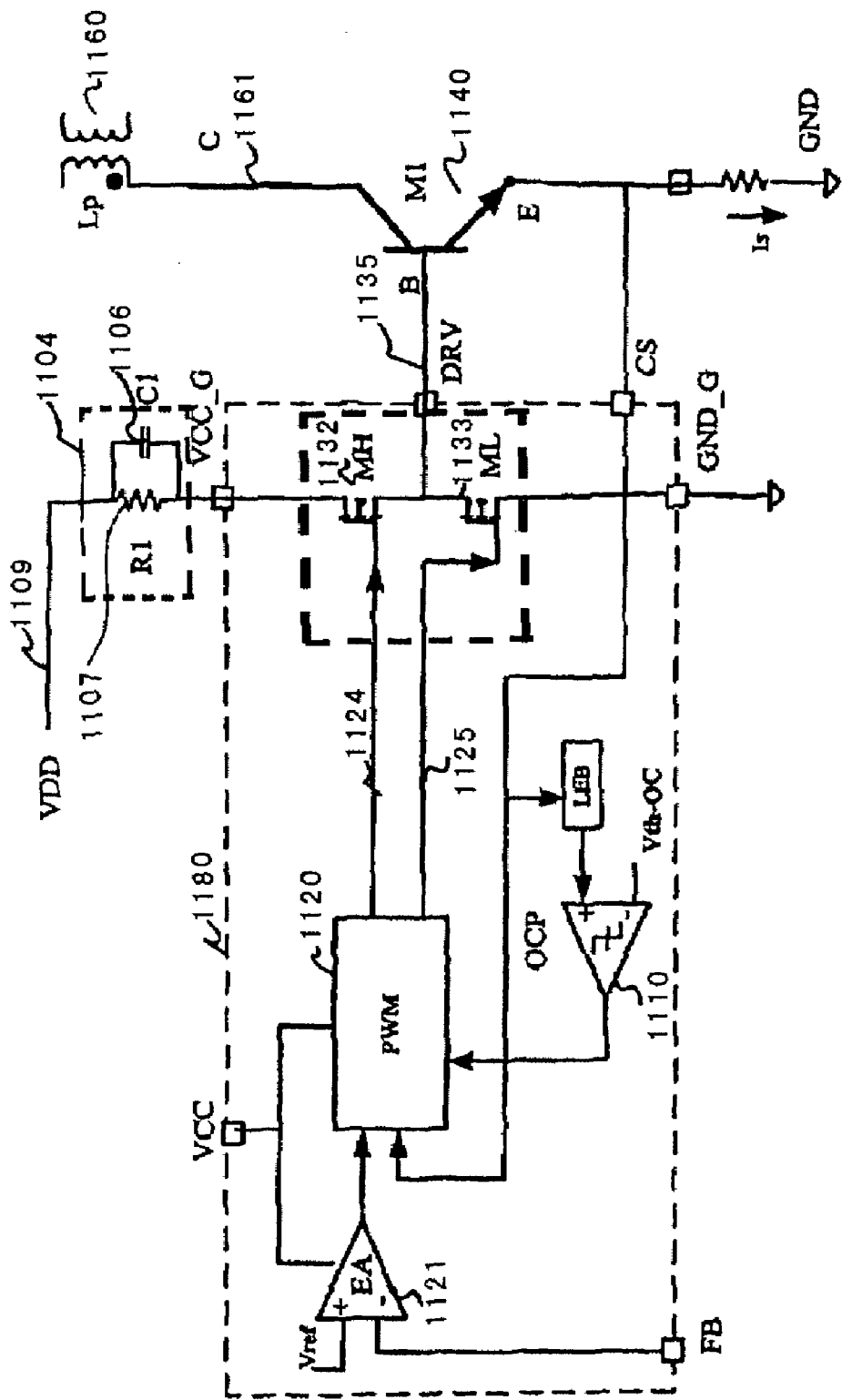
FIG. 11 is a simplified diagram illustrating an integrated switch mode converter according to an embodiment of the present invention.

FIG. 11 is a simplified diagram illustrating an integrated switch mode converter according to an embodiment of the present invention. This diagram is merely an example, which should not unduly limit the scope of the claims. One of ordinary skill in the art would recognize many variations, alternatives, and modifications.

A power system 1100 includes a integrated switch mode converter 1180, a power switch 1140, and a primary winding 1160. For example, the integrated switch mode converter 1080 is implemented in a single chip. The power system 1100 also includes impedance 1106. According to an embodiment, the impedance 1106 includes resistor 1107 and capacitor 1104 in parallel. Depending upon application, the impedance 1106 can be implemented with other types of components as well. For example, the impedance 1106 includes additional resistor and capacitors.

The integrated switch mode converter 1180 including the following components:
- an amplifier 1121;
- a PWM controller component 1120;
- an OCP comparator 1110; and
- a gate driver 1130.

Depending upon application, the integrated switch converter 1180 may include other components, such as amplifier, resistor, capacitor, etc. As shown in FIG. 8, the power switch 1140 is implemented with an npn power BJT. Depending upon application, the power switch 1140 can be implemented with other types of components, such MOSFET, IGBT, etc. The terminal 1161 of the power switch 1140 is electrically connected to the PWM controller 1120 component to provide a feedback signal. Terminal 1161 of the power switch 1140 is electrically connected to the primary winding 1160. For example, the terminal 1161 is connected to the collector terminal of the BJT.

The gate driver 1130 is implemented with two power MOSFETs MH 1132 and ML 1133. The MH 1132 receives input 1124 from the PWM controller component 1120. The ML 1133 receives input 1125 from the PWM controller component 1120. The PWM controller component 1120 is configured to provide complimentary inputs to the MH 1132 and M 1133. For example, when input 1124 is on, the input 1125 is off; when input 1124 is off, the input 1125 is on. According to an embodiment, the PWM controller component includes logic module to provide complimentary inputs 1124 and 1125. In addition, the MH 1032 is connected to a voltage source VCC_G 1131.

The voltage of the voltage source VCC_G 1131 is partly determined by the impedance 1106, which is connected to the voltage source VDD 1109. The amount of electrical current that can be provided by the VCC_G 1131 is also partly determined by the impedance 1106. For example, amount of current at VCC_G is inversely proportional to the resistance value of resistor 1107 (I=VDD/R1). The current provided by the VCC_G is essentially provided to the power switch 1140 as the base current of the BJT. As a result, the response time of the power switch 1140 is affected by the resistance value of the resistor 1107. For example, a large resistance value for the resistor 1107 produces a small current for the power switch and a slow response time. On the other hand, a large resistance value for the resistor 1107 produces a large current for the power switch and a fast response time.

The response time of the power switch is also related to the capacitor 1106. For example, charges stored in the capacitor 1106 is used to provide transient current that can be provided to the BJT. Typically, the charges stored in the capacitor 1006 reduces the time it required for the power switch 1140 to turn on.

As an example, various voltage sources (e.g., VCC, VDD, VCC_G) are implemented with power sources, such as AC power source, DC power source, etc. Typically, power source are not a part of the power switch and connected to the power switch via standard connection pins.

According to yet another embodiment, the present invention provides a system for providing switching. The system includes a first voltage supply that is configured to provide a first voltage. The system also includes an impedance that can be characterized by an impedance value. The impedance includes a resistor and a capacitor, the resistor and capacitor being in parallel. The system additionally includes a controller component that is electrically coupled to the first voltage supply. The controller component is configured to receive at least a first input signal and a provide a first output signal and a second output signal. The system additionally includes a gate driver component that includes a first transistor and a second transistor. The gate driver component is configured to receive the first output signal and the second output signal and generate a third output signal in response to at least the first output signal and the second output signal. The system additionally includes a switch that is configured to receive the third output signal and change between a first state and a second state in response to the third output signal. The first transistor includes a first terminal, a second terminal, and a third terminal. The second transistor includes a fourth terminal, a fifth terminal, and a sixth terminal. The first terminal is electrically coupled to the impedance. The second terminal is configured to receive the first output signal. The third terminal is electrically coupled to the fourth terminal. The fifth terminal is configured to receive the second output signal. The third output signal is associated with a voltage related to the third terminal and the fourth terminal. For example, the embodiment is illustrated according to FIGS. 10-11.

According to yet another embodiment, the present invention provides a system for providing switching. They system includes an integrated circuit package. The integrated circuit package includes a first terminal being configured to receive a first voltage. The package also includes a second terminal that is configured to receive a second voltage and being independent of the first terminal. The package additionally includes a controller component that is electrically coupled to the first voltage terminal. The controller component is configured to receive at least a first input signal and to provide a first output signal. The package additionally includes a gate driver component that is electrically coupled to the second voltage terminal. The gate driver component is configured to receive the first output signal and generated a second output signal in response to the second voltage and the first output signal. The package also includes a switch being configured to receive the second output signal and change between a first state and a second state in response to the second output signal. For example, the embodiment is illustrated in FIGS. 4 and 5.

It is to be appreciated the present invention provide various advantages. According to various embodiments, the present invention provides a solution for reducing power consumption of switching devices and unwanted EMI. More particularly, the present invention offers a higher degree of flexibility in the design and implementation of power system. According to various embodiments, the present invention provides the ability to adjust the response time and efficient of power switch. For example, the present invention can be easily implemented with integrated switch mode power converter design. According to an embodiment, the present invention can also be practiced in a switch mode power converter design where power controller and power switch are implemented on separate chips. There are other benefits as well.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A system for providing switching, the system comprising:
a first impedance characterized by a first impedance value;
a second impedance characterized by a second impedance value;

a controller component configured to receive at least an input signal and provide a first output signal and a second output signal;

a gate driver component including a first transistor and a second transistor, the gate driver component being configured to receive the first output signal and the second output signal and generate a third output signal in response to at least the first output signal and the second output signal; and a switch configured to receive the third output signal and change between a first state and a second state in response to at least the third output signal;

wherein:
the first transistor includes a first terminal, a second terminal, and a third terminal;
the second transistor includes a fourth terminal, a fifth terminal, and a sixth terminal;
the first terminal is coupled to the first impedance; and
the sixth terminal is coupled to the second impedance.

2. The system of claim 1 wherein:
the controller component is located on a first chip; and
the switch is located on a second chip.

3. The system of claim 1 wherein the controller component and the switch are located on a chip.

4. The system of claim 1 wherein:
the first state is "on"; and
the second state is "off".

5. The system of claim 1 wherein the switch is characterized by a first response time and a second response time.

6. The system of claim 5 wherein:
the first response time is associated with the first impedance value; and
the second response time is associated with the second impedance value.

7. The system of claim 5 wherein:
the first response time includes a rise time; and
the second response time includes a fall time.

8. The system of claim 1 wherein:
the first impedance value is adjustable; and
the second impedance value is adjustable.

9. The system of claim 1 wherein:
the first impedance includes a first resistor; and
the second impedance includes a second resistor.

10. The system of claim 1 wherein:
the first terminal is a drain terminal of the first transistor;
the second terminal is a gate terminal of the first transistor;
the third terminal is a source terminal of the first transistor;
the fourth terminal is a drain terminal of the second transistor;
the fifth terminal is a gate terminal of the second transistor; and
the sixth terminal is a source terminal of the second transistor.

11. A system for providing switching, the system comprising:
an impedance characterized by an impedance value, the impedance including a resistor and a capacitor, the resistor and the capacitor being in parallel;
a controller component configured to receive at least an input signal and provide a first output signal and a second output signal;
a gate driver component including a first transistor and a second transistor, the gate driver component being configured to receive the first output signal and the second output signal and generate a third output signal in response to at least the first output signal and the second output signal; and
a switch configured to receive the third output signal and change between a first state and a second state in response to at least the third output signal;
wherein:
the first transistor includes a first terminal, a second terminal, and a third terminal;
the second transistor includes a fourth terminal, a fifth terminal, and a sixth terminal; and
the first terminal is coupled to the impedance.

12. The system of claim 11 wherein:
the controller component is located on a first chip; and
the switch is located on a second chip.

13. The system of claim 11 wherein the controller component and the switch are located on a chip.

14. The system of claim 11 wherein the switch includes a bipolar junction transistor, the bipolar junction transistor including an emitter terminal, a base terminal, and a collector terminal.

15. The system of claim 11 wherein:
the first state is "on"; and
the second state is "off".

16. The system of claim 11 wherein the switch is characterized by a rise time.

17. The system of claim 16 wherein the rise time is associated with the impedance value.

18. The system of claim 11 wherein:
the first terminal is a drain terminal of the first transistor;
the second terminal is a gate terminal of the first transistor;
the third terminal is a source terminal of the first transistor;
the fourth terminal is a drain terminal of the second transistor;
the fifth terminal is a gate terminal of the second transistor; and
the sixth terminal is a source terminal of the second transistor.

19. The system of claim 11 wherein the sixth terminal is biased at ground.

20. The system of claim 11 wherein the resistor is a variable resistor.

21. A system for providing switching, the system comprising:
an integrated circuit package, the integrated circuit package including:
a first terminal configured to receive a first voltage;
a controller component coupled to the first terminal, the controller component being configured to receive at least a first input signal and provide at least a first output signal;
a second terminal separate from the first terminal, the second terminal being configured to receive a second voltage;
a third terminal separate from the first terminal and the second terminal, the third terminal being configured to receive a third voltage, the third voltage being different from the second voltage;
a gate driver component coupled to the second terminal and the third terminal, the gate driver component being configured to receive at least the first output signal and generate a second output signal in response to at least the first output signal;
a fourth terminal configured to be coupled to a primary winding;
a fifth terminal separate from the second terminal and the third terminal; and
a switch coupled to the fourth terminal and the fifth terminal, the switch being configured to receive the second output signal and change between a first state and a second state in response to at least the second output signal.

22. The system of claim 21 wherein the controller component and the switch are located on a chip in the integrated circuit package.

23. The system of claim 21 wherein:
the first state is "on"; and
the second state is "off".

24. The system of claim 21 wherein the switch includes a bipolar junction transistor.

25. The system of claim 21 wherein the switch includes a field effect transistor, the field effect transistor including at least a drain terminal and a source terminal.

26. The system of claim 25 wherein the first input signal is a feedback signal from the drain terminal of the field effect transistor.

27. The system of claim 25 wherein the first input signal is a feedback signal from the source terminal of the field effect transistor.

28. The system of claim 21 wherein the controller component includes a pulse-width-modulation controller component.

29. The system of claim 21 wherein the integrated circuit package further includes an over-current-protection component coupled to the controller component.

30. A system for providing switching, the system comprising:
an integrated circuit package, the integrated circuit package including:
a first terminal configured to receive a first voltage;
a controller component coupled to the first terminal, the controller component being configured to receive at least a first input signal and provide at least a first output signal;
a second terminal separate from the first terminal, the second terminal being configured to receive a second voltage;
a third terminal separate from the first terminal and the second terminal, the third terminal being configured to receive a third voltage, the third voltage being different from the second voltage;
a gate driver component coupled to the second terminal and the third terminal, the gate driver component being configured to receive at least the first output signal and generate a second output signal in response to at least the first output signal;
wherein the gate driver is coupled to a switch, the switch being configured to receive the second output signal and change between a first state and a second state in response to at least the second output signal.

31. The system of claim 30 wherein:
the first state is "on"; and
the second state is "off".

32. The system of claim 30 wherein the switch includes a bipolar junction transistor.

33. The system of claim 30 wherein the switch includes a field effect transistor.

34. The system of claim 30 wherein the controller component includes a pulse-width-modulation controller component.

35. The system of claim 30 wherein the integrated circuit package further includes an over-current-protection component coupled to the controller component.

* * * * *